Jan. 30, 1951        R. A. BUTLAND        2,539,399
SLEEPING BAG INSULATION TESTING APPARATUS AND METHOD
Filed Feb. 15, 1945        2 Sheets—Sheet 1
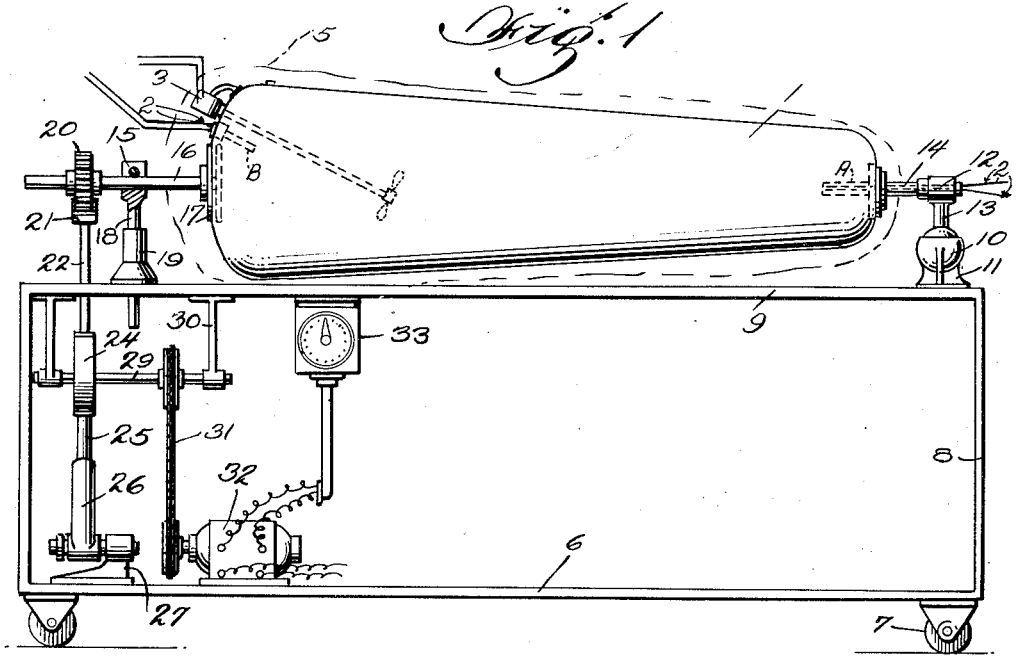
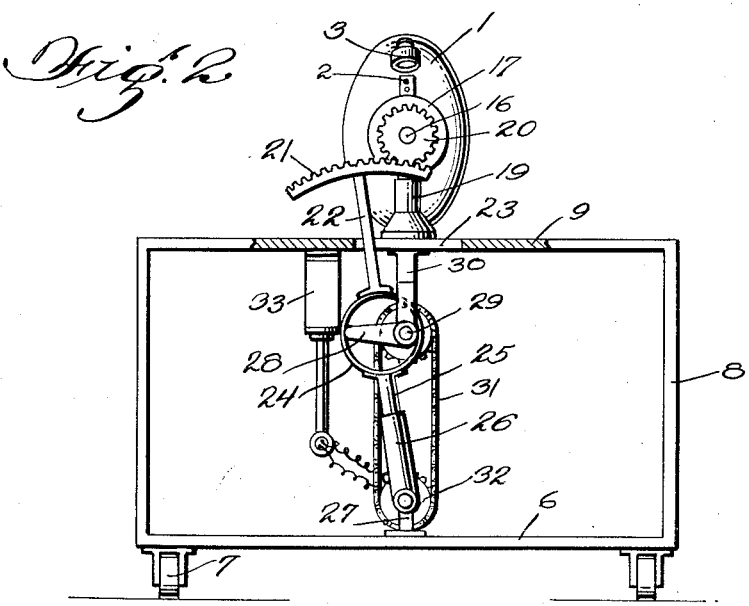
INVENTOR.
Ralph A. Butland
BY William F. Desmond
ATTORNEY Jan. 30, 1951 R. A. BUTLAND 2,539,399
SLEEPING BAG INSULATION TESTING APPARATUS AND METHOD
Filed Feb. 15, 1945 2 Sheets-Sheet 2
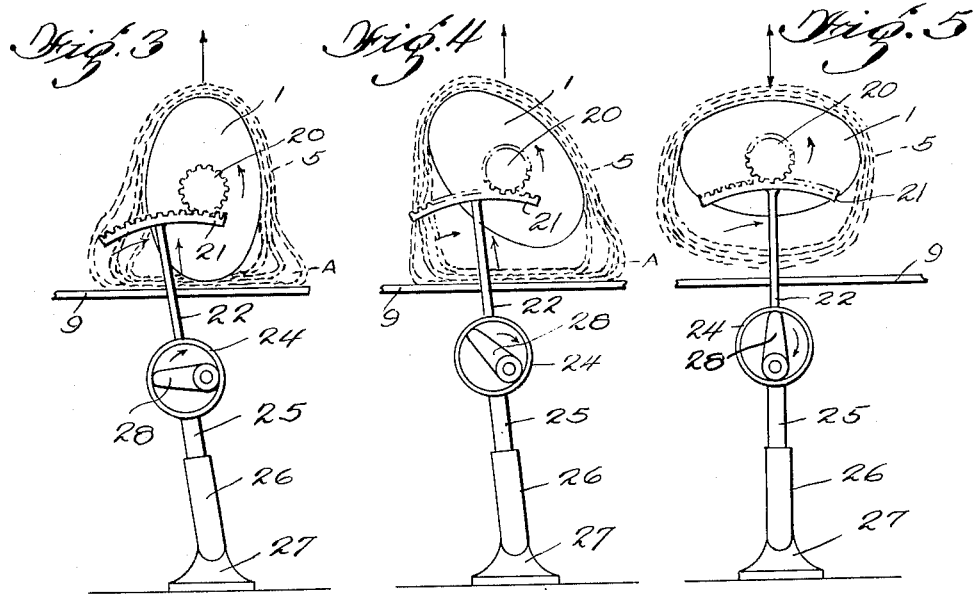
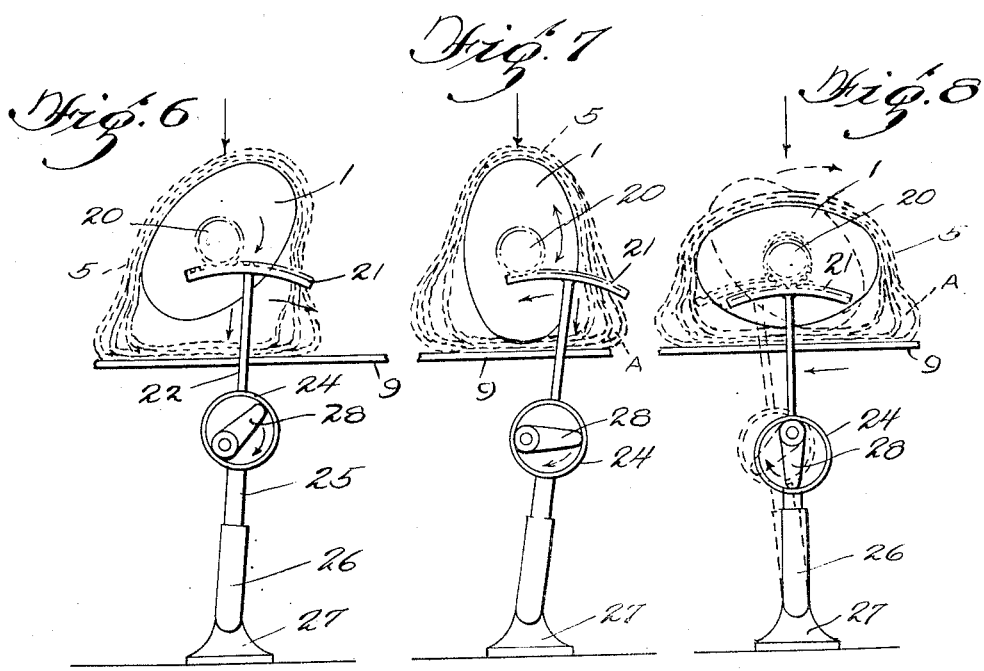
INVENTOR.
Ralph A. Butland
BY
William F. Deemond
ATTORNEY Patented Jan. 30, 1951

2,539,399

UNITED STATES PATENT OFFICE 2,539,399

SLEEPING BAG INSULATION TESTING APPARATUS AND METHOD

Ralph A. Butland, Philadelphia, Pa.

Application February 15, 1945, Serial No. 577,983

17 Claims. (Cl. 73—15)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to a method for testing the heat-insulating qualities of sleeping bags and the like, and to an apparatus for carrying out the method.

Sleeping bags are ordinarily constructed of many combinations of outer fabrics to repel rain and weather and inner linings of woolen materials, kapok, quilted fibres, textiles, down, chicken feathers, etc., to provide the desired heat-insulating qualities. Means and methods have been heretofore employed for testing such materials individually as to their warmth characteristics, but so far as known there is no practical method or apparatus for testing such materials when assembled into a completely finished article such as a sleeping bag, nor for making such a test under actual conditions of service.

It is well known, of course, that heat losses may be occasioned by radiation, convection and conduction. It is obvious therefore that if accurate and reliable tests of the heat-retaining qualities of various articles are to be made they must not only be made under similar conditions but also the conditions must closely approximate those encountered in actual practice so that the heat losses by radiation, convection and conduction may be accurately simulated.

It is accordingly an object of the present invention to provide a method of testing the heat-retaining qualities of sleeping bags and the like in such manner that the movements of a sleeping person are closely simulated during the test so that the losses of heat by convection, conduction and radiation may occur in the same manner and to the same extent as in actual practice.

A further object of the invention resides in the provision of a representative mechanism suitable for performing the several steps of the method.

Other objects and advantages of the invention will be apparent from the following description when taken in connection with the accompanying drawings, in which, Figure 1 is a front elevational view of the apparatus.

Figure 2 is an end view of the apparatus, parts being broken away, and

Figures 3 to 8 inclusive are more or less diagrammatic views of the apparatus with the sleeping bag shown in position thereon, the views representing various positions of the body member through one cycle of operation.

Referring to the drawings in more detail, the numeral 1 indicates an elongated body member formed of copper or other suitable material, preferably coated with black lacquer on its exterior surface. This hollow body member is substantially oval in cross-section and of approximately the shape and size of an adult human body.

The purpose of the body member 1, of course, is to give off heat in simulation of the heat radiation of the human body, and to this end an electric heater A is mounted on the interior of the body 1 and connected by wiring 2 to a suitable source of electric energy. The interior of the body member 1 is preferably filled with oil or similar liquid to be heated by the electric heater, and the numeral 3 indicates generally a motor and propeller, also connected in circuit 2 for maintaining a circulation of the liquid and thereby provide for a substantially uniform radiation of heat throughout the surface of the body 1. It is essential, of course, to maintain the temperature of the body 1 at about 98.6° F., the normal temperature of the human body, and for this purpose a thermostatic control B for the heater may be mounted in the body 1 in association with the circuit 2. These elements are shown in more detail in my Patent No. 2,347,661. A calibrated watt hour meter may be used for registering the expenditure of current required to maintain the desired temperature within the body 1.

The sleeping bag or other article which is to be tested as to its heat-retaining qualities is indicated by the numeral 5 and may be slipped over the body 1 in a manner which will appear hereinafter. The structural features of the bag 5 are unimportant insofar as the present invention is concerned except that it should be mentioned that they are usually formed of a plurality of layers of material, as indicated in Figures 3 to 8 inclusive, and that in actual use these layers are disturbed by movements of the occupant so as to form air pockets or dead-air spaces of varying extent, also as indicated in the several views.

As mentioned hereinbefore, heat losses may occur by means of radiation, conduction and convection, and the extent of the heat loss will therefore vary to a large extent depending upon the position of the body relative to the support upon which it rests and the number and total cubic contents of the air pockets. These variables are clearly illustrated in the drawings in which the condition of the laminated bag is shown when the body 1 is resting in a stationary position on its narrower edges in certain views and on one of its wide sides in another view. The air pockets are indicated by the letter "A" in Figures 3 to 8 inclusive, but it will be noted that the pockets in Figures 3 and 7 envelope the larger sides of the body 1 while in Figure 8 they envelope the narrower sides. It will also be noted that in Figures 3 and 7 the weight of the body rests on its narrower edges, and on one of its wider sides in Figure 8. In Figures 3 and 7 therefore the heat loss by convection is greater than the heat loss by conduction, whereas, in Figure 8 the reverse is true. These positions of the mechanical body 1 are representative of the positions of a person when sleeping on his side and on his back, and hence the effectiveness of the bag may be tested under conditions substantially identical with those encountered in actual use.

The body 1 with the specimen to be tested thereon may be turned from one position to another, and allowed to rest in the various positions, for a period of time corresponding approximately to the stationary periods of a sleeping person, by any suitable mechanism, and it is therefore intended that the mechanism disclosed herein and about to be described, be considered as illustrative of the construction rather than in any limiting sense.

The body 1 may be rotatably mounted on a mobile carriage comprising a base member 6 provided with wheels or casters 7, and end and side members 8 supporting a table top 9 or the like on which the covered body 1 may rest in its several positions in the same manner that a human being would lie on a similar surface.

A ball and socket joint 10 is mounted at one end of the table 9 by means of pedestal 11, and a bearing member 12, open at its upper edge, is connected with the ball and socket joint by the rigid bar 13. This member 12 forms a bearing for a journal 14 extending from the smaller end of the body member 1, and a somewhat similar bearing member 15 receives a journal 16 fixed to the head end of the body member. Each of these journals is preferably heat-insulated at its connection with the body 1, the joint being indicated by reference numeral 17, so as to minimize the dissipation of heat through these parts.

The bearing 15 is fixed to a rod 18 which may be slidably mounted in a guide member 19 secured to the table 9. The outer end of journal is provided with a pinion 20 fixed thereto and adapted to cooperate with an arcuate rack 21 fixed to the upper end of a rod 22 extending downwardly through an elongated slot 23 extending transversely of the table. The lower end of rod 22 is fixed to a ring 24, and diametrically opposite the rod 22 is a rod 25 also fixed to ring 24 and reciprocably mounted in a socket member 26 pivotably mounted on a pedestal 27 supported on the base 6.

Within the ring 24 is mounted a cam or eccentric 28 fixed to a shaft 29 supported on hangers 30 and extending through the ring 24. The shaft 29 may be intermittently rotated by the sprocket mechanism 31 driven by motor 32, the latter being controlled by any suitable timing mechanism 33 supported from the under side of table 9.

It will be obvious that the rod 22 and rack 21 will be both angularly and vertically oscillated by the eccentric 28 when the shaft 29 is rotated. Since the rack 21 engages with the pinion 20 on the rotatably mounted shaft 16 secured to the head end of the body 1, and the rear end of the body is swiveled in the ball and socket joint 10, the raising and lowering of the rack 21 will elevate and lower the head end of the body 1, and movement of the rack in its arc will cause the body to rotate about its longitudinal axis. Thus, by controlling rotation of shaft 29 it is possible to raise the head end of the body 1 and shift it from one position to another.

In the operation of the device, the journal 14 is first lifted from the bearing 12 and the sleeping bag to be tested is placed thereon, as indicated in dotted lines in Figure 1, a small aperture having been first formed in the base of the bag so that the journal 14 may extend therethrough. Either before or after the bag is enclosed about the body 1 the current is turned on the heater and the stirrer set in motion. When the temperature reaches 98.6° F. the motor 32 is set in motion and is controlled by the timer 33, the temperature being maintained at 98.6° F. through the medium of the thermostat, and the amount of current used for this purpose is measured by the watt hour meter.

The operation of the particular mechanism shown for simulating the body movements of a sleeping person will now be described, it being understood however that the mechanism is merely representative of one of many devices which may be employed for the purpose.

In Figure 8 the body member 1 is indicated as resting on one of its sides, and the cam member 28 has turned to its lowermost position. As the cam rotates in a clockwise direction, as indicated by the arrow and the dotted line position of the cam in Figure 8, the cam ring or strap 24 is moved slightly to the left and upwardly, thereby raising the body 1 from the table top and rotating the same, as indicated in dotted outline. When the cam has moved through 90° the body 1 has been moved to the position indicated in Figure 3 and rests on one of its narrow edges with the major axis of the body extending vertically. This position is representative of a person resting on one side, and the clock mechanism opens the electric circuit so that the body 1 will remain in this position for the desired period of time. The circuit is then automatically closed and the body is rotated through the various positions indicated in Figures 4, 5 and 6, and is allowed to rest on its other narrow edge as represented in Figure 7. Movement is again stopped for the period of time for which the clock 33 is adjusted, and the body is then moved to its third position of rest as indicated in Figure 8 in which the major axis of the body is in a horizontal plane. Thereafter the cycle of operations is repeated as often as may be necessary to indicate a fair average of the heat loss through the bag per unit of time.

As will be readily understood, the readings on the watt hour meter will indicate the amount of current which has been required in maintaining the body 1 at a temperature of 98.6° F., and hence the heat loss of the particular sleeping bag under test can be readily determined.

In accordance with the patent statutes I have described what I now consider to be the preferred form of the process and apparatus, but inasmuch as various changes may be made therein, especially as concerns the apparatus, it is intended that such changes be included within the scope of the appended claims.

What is claimed is:

1. Those steps in a method of testing the heat-retaining qualities of sleeping bags and similar articles, which comprises placing the bag over an elongated heat-radiating body of oval cross-section, intermittently moving the body to various positions within the bag in simulation of the movements of a sleeping person, and measuring the rate of heat loss of the body.

2. Those steps in a method of testing the heat-retaining qualities of sleeping bags and similar articles, which comprises placing the bag over an elongated heat-radiating body of oval cross-section, resting the covered body on a table or the like, intermittently moving the body to various positions within the bag in simulation of the movements of a sleeping person, and measuring the rate of heat loss of the body.

3. The method of testing the heat-retaining qualities of sleeping bags and similar articles, which comprises placing the bag over a heat-radiating body of substantially oval cross-section, simulating the action of a sleeping person by resting the covered body on a table or the like with its major axis extending vertically, then lifting the body and turning it through an angle of 180°, then turning and lowering the body with its major axis extending horizontally, maintaining the body at a constant temperature and measuring the rate of loss of heat from the body.

4. The method of testing the heat-retaining qualities of sleeping bags and similar articles, which comprises placing the bag over a heat-radiating body of oval cross-section, resting the covered body on a table or the like, then turning the body from one position to another in simulation of the movements of a sleeping person, maintaining the body at a constant temperature and measuring the rate of loss of heat from the body.

5. The method of testing the heat-retaining qualities of sleeping bags and similar articles, which comprises placing the bag over a heat-radiating body of oval cross-section, resting the covered body on a table or the like, and then intermittently moving the body and resting the same upon said table in close simulation of the actions of a sleeping person, maintaining the body at a constant temperature and measuring the rate of loss of heat from the body.

6. The method of testing the heat-retaining qualities of sleeping bags and similar articles, which comprises placing the bag over a heat-radiating body of substantially oval cross-section, resting the covered body on a table or the like, intermittently moving the body and resting the same upon said table in close simulation of the actions of a sleeping person, and measuring the rate of heat loss of the body.

7. The method of testing the heat-retaining qualities of sleeping bags and the like, which comprises placing the bag over a heat-radiating body approximately the shape and size of a human being, intermittently moving the body to various positions within the bag in simulation of the movements of a sleeping person, maintaining the temperature of the body at substantially 98.6° F. and measuring the heat loss of the body.

8. The method of testing the heat-retaining qualities of sleeping bags and the like, which comprises placing the bag over a heat-radiating body approximating the shape and size of a human being, resting the covered body on a table or the like, intermittently moving the body to various positions of rest within the bag in simulation of the actions of a sleeping person, maintaining the temperature of the body at substantially 98.6° F. and measuring the heat loss of the body.

9. A mechanism for testing the heat-retaining qualities of sleeping bags and the like, comprising a heat-radiating body approximately conforming to an adult human body in size and shape adapted to be inserted into a sleeping bag, means for maintaining a substantially uniform temperature of about 98.6° F. within the body, means for intermittently moving the body to simulate the movements of a sleeping person, and means for measuring the heat losses of the body.

10. A mechanism for testing the heat-retaining qualities of sleeping bags and the like, comprising a heat-radiating body approximately conforming to an adult human body in size and shape adapted to be inserted into a sleeping bag, a table, upon which said body is adapted to rest in positions simulating a sleeping person, means for shifting the position of the body in simulation of the movements of a sleeping person, and means for measuring the heat losses of the body.

11. A mechanism for testing the heat-retaining qualities of sleeping bags and the like, comprising a substantially adult human-shaped heat-radiating body adapted to be inserted into a sleeping bag, means for raising and lowering and rotating the body in simulation of the movements of a sleeping person, and means for measuring the heat losses of the body.

12. A mechanism for testing the heat-retaining qualities of a sleeping bag or similar article, comprising an elongated heat-radiating body of substantially oval cross-section, said body adapted to be inserted into a sleeping bag, means for periodically moving the body to various positions in simulation of the actions of a sleeping person, means for maintaining a temperature of about 98.6° F. in the body, and means for measuring the rate of heat loss of the body.

13. A mechanism for testing the heat-retaining qualities of a sleeping bag or similar article, comprising a table, an elongated heat-radiating body of oval cross-section associated with the table, said body adapted to be inserted into a sleeping bag, means for periodically moving the body to various positions on the table in simulation of the actions of a sleeping person, and means for measuring the rate of heat loss of the body.

14. The method of testing the heat-retaining qualities of sleeping bags and similar articles, which comprises placing the bag over a heat-radiating body approximating the shape and size of a human being, then intermittently moving the body to various positions within the bag in simulation of a sleeping person, maintaining the body at a constant temperature and measuring the rate of loss of heat from said body.

15. The method of testing the heat-retaining qualities of sleeping bags and similar articles, which comprises placing the bag over a heat-radiating body approximating the shape and size of a human being, resting the covered body on a table or the like, then intermittently moving the body to various positions within the bag in simulation of the movements of a sleeping person, maintaining the body at a constant temperature and measuring the rate of loss of heat from the said body.

16. The method of testing the heat-retaining qualities of sleeping bags and similar articles, which comprises placing the bag over a heat-radiating body approximating the shape and size of a human being, then intermittently moving the body to various positions within the bag in simulation of a sleeping person, electrically maintaining the body at a constant temperature and measuring the quantity of current required to maintain said body at said constant temperature to determine the rate of loss of heat from said body.

17. The method of testing the heat-retaining qualities of sleeping bags and similar articles, which comprises placing the bag over a heat-radiating body approximating the shape and size of a human being, resting the covered body on a table or the like, then intermittently moving the body to various positions within the bag in simulation of the movements of a sleeping person, electrically maintaining the body at a constant temperature and measuring the quantity of current required to maintain said body at said temperature to determine the rate of loss of heat from said body.

RALPH A. BUTLAND.

REFERENCES CITED

The following references are of record in the file of this patent:

UNITED STATES PATENTS

| Number | Name | Date |
|---|---|---|
| 2,154,927 | Yaglou | Apr. 18, 1939 |

FOREIGN PATENTS

| Number | Country | Date |
|---|---|---|
| 44,463 | Denmark | Aug. 10, 1931 |